June 19, 1928.  
H. F. GEORGE  
TRANSMISSION LOCK  
Filed Oct. 2, 1926
1,673,908
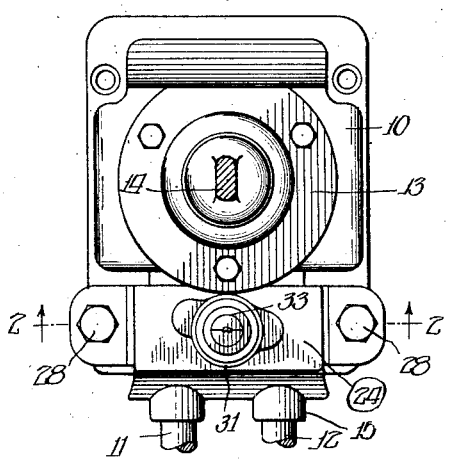
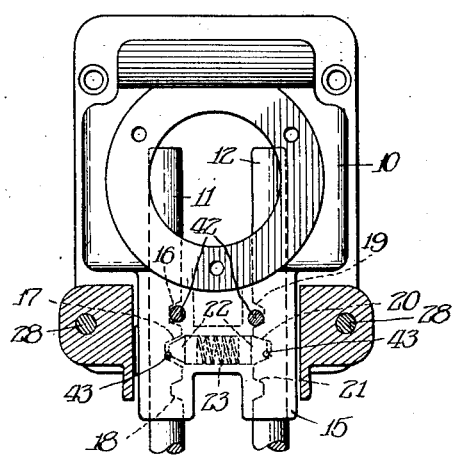
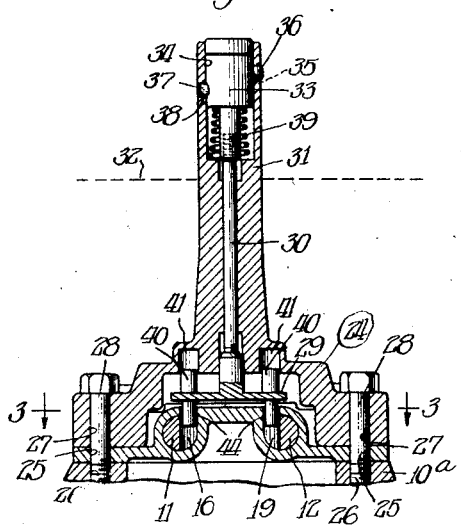
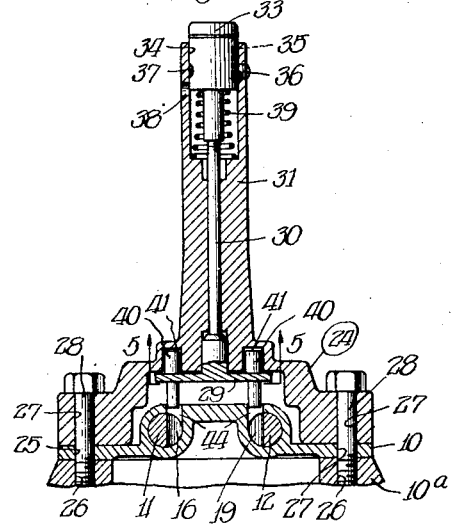
Witness:  
R. Burkhardt
Inventor:  
Harry F. George,  
By Wilkinson, Huxley, Byron & Knight  
Attys Patented June 19, 1928.

1,673,908

UNITED STATES PATENT OFFICE.

HARRY F. GEORGE, OF CHICAGO, ILLINOIS.

TRANSMISSION LOCK.

Application filed October 2, 1926. Serial No. 139,050.

The present invention relates to improvements in transmission locks.

More particularly the present invention relates to locking means for locking the usual gear shifting rods of a motor vehicle.

An object of the present invention is to provide a transmission lock which is readily adaptable to cars as at present designed and manufactured.

A further object is to provide a transmission lock which is positive and simple in operation and which has the advantage that insurance may be had that when the car is locked it will always be locked in neutral.

A further object is to provide a simple and cheap construction readily adaptable to cars as now designed and manufactured, which construction may be applied not only to cars in course of manufacture, but also to cars already in service.

Further objects will appear as the description proceeds.

Referring to the drawings—

Figure 1 is a top plan view of a portion of a motor vehicle having reference to the gear shifting members thereof, said portion having applied thereto one embodiment of the present invention;

Figure 2 is a sectional view taken along the plane indicated by the arrows 2—2 of Figure 1, showing the parts in locked position;

Figure 3 is a sectional view taken along the plane indicated by the arrows 3—3 of Figure 2;

Figure 4 is a view similar to Figure 2 but showing the parts in unlocked position; and Figure 5 is a bottom plan view of a locking plate employed in the present invention, said view being taken in the direction of the arrows 5—5 of Figure 4.

The numeral 10 indicates the cover plate of a casing 10ª (see Figures 2 and 4), which casing houses the gear shifting rods of a motor vehicle, which gear shifting rods are indicated by the numerals 11 and 12. Mounted upon said cover plate is a casting 13, which provides a bearing for the usual gear shifting lever 14. Said gear shifting lever 14, in a manner which is well understood and which need not be explained herein, operates to selectively move the gear shifting rods 11 and 12 to predetermined positions longitudinally of said rods. Said cover plate 10 has an elongated portion 15 providing bearings for said rods 11 and 12. According to usual construction, said rods 11 and 12 have recesses in the form of V-shaped notches in the adjacent sides thereof, there usually being three notches in each of said rods. The notches in the rod 11 are indicated by the numerals 16, 17 and 18, and the notches in the rod 12 are indicated by the numerals 19, 20 and 21. Ordinarily a pair of detents 22—22 are provided, which detents are spring-pressed apart by a spring 23. Said detents, which commonly have their outer extremities of conical conformation, fit into two of the V-shaped notches 16, 17, 18, 19, 20 and 21.

In its specific aspects the present invention utilizes the fact that a conical detent fits within a V-shaped notch in a manner which will be referred to hereinafter. The three notches in the gear shifting rods 11 and 12 are not evenly spaced in all types of cars. Advantage of this difference in the placing of the notches is taken in the practice of the present invention in certain of its aspects. In certain types of cars the middle notches 17 and 20 of the two rods 11 and 12 are deeper than are the two end notches. Advantage of this fact is also taken in the practice of the present invention in certain of its aspects.

As is well understood, the detents 22—22, by reason of the fact that they are pressed apart by the spring 23, serve to yieldably hold the gear shifting rods 11 and 12 in the positions to which they may have been moved. The present invention contemplates auxiliary means for fitting into certain of the recesses in said gear shifting rods 11 and 12 to hold said gear shifting rods positively against movement.

In accomplishing the results above referred to, the present invention contemplates the provision of an attachment indicated as a whole by the numeral 24, which attachment is readily attachable to the casing 10ª and cover plate 10. Said cover plate 10, at the elongated portion 15 thereof, is ordinarily provided with a pair of apertures 25—25, which register with screw-threaded apertures 26—26 in the casing 10ª. Stud bolts are ordinarily provided for mounting in said apertures 25 and 26. According to the present invention, the attachment 24 is provided with apertures 27—27 adapted to register with the apertures 25—25 and apertures 26—26. Stud bolts 28 are provided for holding said attachment 24 in position.

Said attachment 24 is cored out to provide space for a reciprocable plate 29 or the like, which plate 29 is mounted at the lower extremity of a stem 30, which stem 30 is housed within the column 31, which column projects to a region above the floor board, the upper extremity of which floor board is indicated by the line 32. Disposed in the upper extremity of the column 31 is certain locking mechanism. The particular type of locking mechanism illustrated comprises an axially movable locking member 33 adapted to have a limited axial movement within the bore 34 at the upper extremity of the column 31. In order to limit the axial movement of said locking member 33, said locking member may be provided with a slot 35, which slot is closed at both ends and which receives the pin 36, which pin may be riveted in place in the column 31. The illustrated locking member 33 is a key-controlled locking member and includes a spring-actuated, radially movable bolt 37 adapted to snap into the radial aperture 38 in the column 31. The spring 39 tends to hold the locking member 33 at the outer limit of its travel. The spring-actuated bolt 37, when disposed within the aperture 38, holds the locking member 33 in its innermost position against the tension of the spring 39. Locking members of the kind referred to are readily purchasable in the open market and need not be described in detail herein. It will be sufficient to state that when it is desired to lock the plate 29 in its lowermost position, the locking member 33 will be moved inwardly against the tension of the spring 39, until the spring-actuated bolt 37 snaps into the aperture 38. When it is desired to unlock the plate 29, the proper key may be inserted and turned through part of a revolution. Such action will retract the bolt 37 in the aperture 38, allowing the spring 39 to move the locking member 33 to the upper limit of its travel moving the plate 29 to its uppermost or non-locking position. The upper side of the plate 29 is provided with a plurality of pins 40—40 adapted to ride in corresponding apertures 41—41 to hold the plate 29 in proper alignment in its reciprocating movement.

Projecting from the under side of the plate 19 are a pair of pins 42—42, which when the gear shifting rods 11 and 12 are in neutral positions are located in alignment with the recesses 16 and 19 of the gear shifting rods 11 and 12. It will be clear that, with the gear shifting rods 11 and 12 in neutral positions, if the plate 29 is disposed in its lowermost position, said pins 42—42 will be located within said recesses 16 and 19 to hold said gear shifting rods 11 and 12 positively in said neutral positions. It will be observed that, unless some guarding means is provided, the studs 42—42 might hold the gear shifting rods 11 and 12 immovably in positions other than neutral positions. Such a contingency is impossible in the practice of the present invention, however, by reason of the fact that said plate 29 is provided with a second pair of downwardly extending studs 43—43 which are so positioned that, except when the gear shifting rods 11 and 12 are in neutral positions, said studs 43—43 abut against said rods 11 and 12 if the locking plate be moved downwardly and will prevent movement of said studs 42—42 to locking position. In order to permit the studs 42—42 and 43—43 to engage the gear shifting rods 11 and 12, apertures 44—44 are provided in the upper part of the elongated portion 15 of the cover plate 10, said apertures 44—44 being in alignment with said studs 42—42 and 43—43. By reason of the fact that recesses 17 and 20 are V-shaped notches and the extremities of the detents 22—22 are conical, sufficient space is provided in the ordinary motor vehicle construction plate 29 may not be moved to locking position themselves within the recesses 17 and 20 when the detents 22—22 are disposed in said recesses 17 and 20. In order that the plate 29 may not be moved to locking position except when the gear shifting rods 11 and 12 are in neutral positions, the distance between the studs 43—43 may be greater than the distance between the studs 42—42. Inasmuch as in many designs of motor vehicles the outermost recesses 28 and 18 of the gear shifting rod 11 and outermost recesses 19 and 21 of the gear shifting rod 12 are deeper than are the middle recesses 17 and 20, the advantage accrues that said studs 43—43 will prevent the downward movement of the plate 29 except when said middle recesses 17 and 20 are disposed in position to receive said studs 43—43; that is to say—the plate 29 may be moved downwardly only when the gear shifting rods 11 and 12 are in neutral positions.

Moreover, as mentioned above, in certain designs of motor vehicles the spacing of the recesses in the rods 11 and 12 is now uniform. Studs 42—42 and 43—43 will be disposed in position to locate themselves within four of the recesses in the two rods at such times that the rods are in neutral positions. By reason of the non-uniform spacing referred to, said four studs will not find their way into recesses in said gear shifting rods 11 and 12 when either of said rods has been moved from neutral position.

The present invention provides an attachment which may be sold and applied to cars already in service by persons having a minimum of mechanical skill. In applying the attachment to existing cars, the apertures 44—44 will be drilled in the top of the elongated portion 15 of the cover plate 10. For the purpose of locating said holes 44—44, a simple jig may be provided, which jig need not be illustrated or described inasmuch as it forms no part of the present invention and inasmuch as jigs suitable for the purpose will at once occur to those skilled in the art. After the holes 44—44 are drilled in their proper locations, the stud bolts 28 will be mounted in position to hold the attachment 24 and cover plate 10 securely in position upon the casing 10ª.

As explained above, with the gear shifting rods 11 and 12 in neutral positions, the locking plate 29 may be moved downwardly and locked in its lowermost position by a simple downward movement upon the locking member 33, which will cause the spring-actuated bolt 37 to snap into the aperture 38. At this time the downwardly extending studs 42—42 of the locking plate 29 will be disposed within the recesses 16 and 19 of the gear shifting rods and the studs 43—43 will be disposed within the middle recesses 17 and 20. When it is desired to unlock the transmission, application of the proper key to the locking member 33 will result in the retraction of the locking bolt 37, whereby the spring 39 will actuate the locking plate 29 upwardly to release the studs 42—42 and 43—43 from the gear shifting rods 11 and 12. As explained above, it will be impossible to lock the motor vehicle in any but neutral position, for the reason that the pins 43—43 will not enter the recesses except when the gear shifting rods 11 and 12 are in neutral positions.

Though a preferred embodiment of the present invention has been described in detail, many modifications will occur to those skilled in the art. It is intended to cover all such modifications that fall within the scope of the appended claims.

What is claimed is—

1. An attachment for the gear shift casing of a motor vehicle comprising a member adapted to be bolted to said casing, said member including a reciprocable locking member, said locking member including abutment means for fitting within the gear shifting rods of said casing and having other abutment means for preventing the movement of said first mentioned abutment means except when said gear shifting rods are in a predetermined position.

2. In combination, the gear shift casing of a motor vehicle including the usual recessed gear shifting rods within said casing, a cover plate for said casing, said cover plate and casing having registering bolt holes, and an attachment for said casing and cover plate comprising a portion having bolt holes registering with said first mentioned bolt holes and also comprising a lock-controlled reciprocable locking member comprising detents adapted to fit within predetermined recesses in said gear shifting rods, said locking member having abutment portions for preventing locking functions of said locking member except when said gear shifting rods are in neutral position.

3. In combination with the usual gear shift casing of a motor vehicle having a pair of gear shifting rods each provided with recesses for cooperation with a detent for holding said rods in predetermined position, a locking member comprising a lock-controlled reciprocable member having detents adapted to be inserted within certain of said recesses to prevent movement of said rods.

4. In combination with the usual gear shift casing of a motor vehicle having a pair of gear shifting rods each provided with recesses for cooperation with a detent for holding said rods in predetermined position, a locking member comprising a lock-controlled reciprocable member having detents adapted to be inserted within certain of said recesses to prevent movement of said rods, said reciprocable member being provided with an abutment portion positioned to abut one of said rods to prevent locking functions of said reciprocable member except when said rods are in neutral position.

5. In combination with the usual gear shift casing of a motor vehicle, including a pair of longitudinally movable gear shifting rods having recesses and detent means adapted to be disposed within said recesses to yieldably hold said rods in predetermined positions, a locking device adapted to be secured to said casing, said locking device including a lock-controlled reciprocable locking member having a plurality of studs projecting therefrom, certain of said studs being adapted to enter certain of said recesses when said gear shifting rods are in neutral position for locking said rods against movement, other of said studs being positioned to contact with said rods to prevent movement of said first mentioned studs to locking position except when said rods are in neutral position.

6. In combination, a gear shift casing having a plurality of screw-threaded bolt holes, a cover plate therefor having a pair of bolt holes registering with said first mentioned bolt holes, a pair of longitudinally movable gear shifting rods having recesses spaced longitudinally thereof, a pair of detent members spring-pressed apart and adapted to enter said recesses to yieldably hold said gear shifting rods in predetermined positions, said cover plate having apertures in the top thereof communicating with certain of said recesses when said rods are in neutral position, and an attachment for said gear shift casing comprising a member having bolt holes communicating with the bolt holes in said casing and cover plate, said attachment including a locking plate having pins projecting from the under side thereof, said locking plate having studs positioned to enter certain of said recesses to lock said gear shifting rods against longitudinal movement, said locking plate being provided with another pin adapted to abut one of said gear shifting rods to prevent movement of said first mentioned studs to locking position except when said gear shifting rods are in neutral position.

7. In combination, a gear shift casing having a plurality of screw-threaded bolt holes, a cover plate therefor having a pair of bolt holes registering with said first mentioned bolt holes, a pair of longitudinally movable gear shifting rods having recesses spaced longitudinally thereof, a pair of detent members spring-pressed apart and adapted to enter said recesses to yieldably hold said gear shifting rods in predetermined positions, said cover plate having apertures in the top thereof communicating with certain of said recesses when said rods are in neutral position, and an attachment for said gear shift casing comprising a member having bolt holes communicating with the bolt holes in said casing and cover plate, said attachment including a locking plate having pins projecting from the under side thereof, said locking plate having studs positioned to enter certain of said recesses to lock said gear shifting rods against longitudinal movement, said locking plate being provided with another pin adapted to abut one of said gear shifting rods to prevent movement of said first mentioned studs to locking position except when said gear shifting rods are in neutral position, said locking plate having studs projecting from the upper side thereof for guiding same in its reciprocating movement.

8. In combination, a gear shift casing having a plurality of screw-threaded bolt holes, a cover plate therefor having a pair of bolt holes registering with said first mentioned bolt holes, a pair of longitudinally movable gear shifting rods having recesses spaced longitudinally thereof, a pair of detent members spring-pressed apart and adapted to enter said recesses to yieldably hold said gear shifting rods in predetermined positions, said cover plate having apertures in the top thereof communicating with certain of said recesses when said rods are in neutral position, an attachment for said gear shift casing comprising a member having bolt holes communicating with the bolt holes in said casing and cover plate, said attachment including a locking plate having pins projecting from the under side thereof, said locking plate having studs positioned to enter certain of said recesses to lock said gear shifting rods against longitudinal movement, said locking plate being provided with another pin adapted to abut one of said gear shifting rods to prevent movement of said first mentioned studs to locking position except when said gear shifting rods are in neutral position, and a spring-actuated locking member for controlling said locking plate, said locking member being biased to non-locking position and having a spring-actuated plunger for releasably holding said locking plate in locking position.

Signed at Chicago, Illinois, this 28th day of September, 1926.

HARRY F. GEORGE.